United States Patent
Stolov (10) Patent No.: US 7,286,664 B1
(45) Date of Patent: Oct. 23, 2007

(54) EFFICIENT IMPLEMENTATION OF MD5 MESSAGE-DIGEST ALGORITHM (RFC1321) ON AN 8 BIT MICRO-CONTROLLER

(75) Inventor: Ilia Stolov, Molon (IL)

(73) Assignee: Winbond Electronics Corporation, Hsinchu (TW)

( * ) Notice: Subject to any disclaimer, the term of this patent is extended or adjusted under 35 U.S.C. 154(b) by 778 days.

(21) Appl. No.: 10/453,847

(22) Filed: Jun. 3, 2003

Related U.S. Application Data (60) Provisional application No. 60/385,476, filed on Jun. 3, 2002.

(51) Int. Cl.
*G09C 5/00* (2006.01)
*H04L 9/00* (2006.01)

(52) U.S. Cl. ........................................ 380/28; 713/180

(58) Field of Classification Search ................ 713/180, 713/181
See application file for complete search history.

(56) References Cited

U.S. PATENT DOCUMENTS

| | | | |
|---|---|---|---|
| 2002/0066014 A1* | 5/2002 | Dworkin et al. ............ 713/168 |
| 2002/0191792 A1* | 12/2002 | Anand ........................ 380/255 |
| 2003/0002666 A1* | 1/2003 | Takahashi ..................... 380/42 |
| 2003/0185391 A1* | 10/2003 | Qi et al. ........................ 380/44 |

* cited by examiner

*Primary Examiner*—Matthew B Smithers (57) ABSTRACT

A method for implementing an MD5 algorithm on an 8-bit micro-controller includes providing a pointer to an entry in a table stored in a read only memory (ROM). The entry corresponds to an operation in the MD5 algorithm. The method also includes retrieving from the entry at least one pointer to at least one variable required for the operation. In addition, the method includes performing the operation.

20 Claims, 9 Drawing Sheets

```
.db LOW MD5_A, LOW MD5_B, LOW MD5_C, LOW MD5_D,  0*4, S11, 0x78, 0xa4, 0x6a, 0xd7
;/* 1 */
.db LOW MD5_D, LOW MD5_A, LOW MD5_B, LOW MD5_C,  1*4, S12, 0x56, 0xb7, 0xc7, 0xe8
;/* 2 */
.db LOW MD5_C, LOW MD5_D, LOW MD5_A, LOW MD5_B,  2*4, S13, 0xdb, 0x70, 0x20, 0x24
;/* 3 */
.db LOW MD5_B, LOW MD5_C, LOW MD5_D, LOW MD5_A,  3*4, S14, 0xee, 0xce, 0xbd, 0xc1
;/* 4 */
.db LOW MD5_A, LOW MD5_B, LOW MD5_C, LOW MD5_D,  4*4, S11, 0xaf, 0x0f, 0x7c, 0xf5
;/* 5 */
.db LOW MD5_D, LOW MD5_A, LOW MD5_B, LOW MD5_C,  5*4, S12, 0x2a, 0xc6, 0x87, 0x47
;/* 6 */
.db LOW MD5_C, LOW MD5_D, LOW MD5_A, LOW MD5_B,  6*4, S13, 0x13, 0x46, 0x30, 0xa8
;/* 7 */
.db LOW MD5_B, LOW MD5_C, LOW MD5_D, LOW MD5_A,  7*4, S14, 0x01, 0x95, 0x46, 0xfd
;/* 8 */
.db LOW MD5_A, LOW MD5_B, LOW MD5_C, LOW MD5_D,  8*4, S11, 0xd8, 0x98, 0x80, 0x69
;/* 9 */
.db LOW MD5_D, LOW MD5_A, LOW MD5_B, LOW MD5_C,  9*4, S12, 0xaf, 0xf7, 0x44, 0x8b
;/* 10 */
.db LOW MD5_C, LOW MD5_D, LOW MD5_A, LOW MD5_B, 10*4, S13, 0xb1, 0x5b, 0xff, 0xff
;/* 11 */
.db LOW MD5_B, LOW MD5_C, LOW MD5_D, LOW MD5_A, 11*4, S14, 0xbe, 0xd7, 0x5c, 0x89
;/* 12 */
.db LOW MD5_A, LOW MD5_B, LOW MD5_C, LOW MD5_D, 12*4, S11, 0x22, 0x11, 0x90, 0x6b
;/* 13 */
.db LOW MD5_D, LOW MD5_A, LOW MD5_B, LOW MD5_C, 13*4, S12, 0x93, 0x71, 0x98, 0xfd
;/* 14 */
.db LOW MD5_C, LOW MD5_D, LOW MD5_A, LOW MD5_B, 14*4, S13, 0x8e, 0x43, 0x79, 0xa6
;/* 15 */
.db LOW MD5_B, LOW MD5_C, LOW MD5_D, LOW MD5_A, 15*4, S14, 0x21, 0x08, 0xb4, 0x49
;/* 16 */
```

FIG. 5A

```
db    LOW MD5_A, LOW MD5_B, LOW MD5_C, LOW MD5_D,  1*4, S21, 0x62, 0x25, 0x1e, 0xf6
;/* 17 */
db    LOW MD5_D, LOW MD5_A, LOW MD5_B, LOW MD5_C,  6*4, S22, 0x40, 0xb3, 0x40, 0xc0
;/* 18 */
db    LOW MD5_C, LOW MD5_D, LOW MD5_A, LOW MD5_B, 11*4, S23, 0x51, 0x5a, 0x5e, 0x26
;/* 19 */
db    LOW MD5_B, LOW MD5_C, LOW MD5_D, LOW MD5_A,  0*4, S24, 0xaa, 0xc7, 0xb6, 0xe9
;/* 20 */
db    LOW MD5_A, LOW MD5_B, LOW MD5_C, LOW MD5_D,  5*4, S21, 0x5d, 0x10, 0x2f, 0xd6
;/* 21 */
db    LOW MD5_D, LOW MD5_A, LOW MD5_B, LOW MD5_C, 10*4, S22, 0x53, 0x14, 0x44, 0x02
;/* 22 */
db    LOW MD5_C, LOW MD5_D, LOW MD5_A, LOW MD5_B, 15*4, S23, 0x81, 0xe6, 0xa1, 0xd8
;/* 23 */
db    LOW MD5_B, LOW MD5_C, LOW MD5_D, LOW MD5_A,  4*4, S24, 0xc8, 0xfb, 0xd3, 0xe7
;/* 24 */
db    LOW MD5_A, LOW MD5_B, LOW MD5_C, LOW MD5_D,  9*4, S21, 0xe6, 0xcd, 0xe1, 0x21
;/* 25 */
db    LOW MD5_D  LOW MD5_A, LOW MD5_B, LOW MD5_C, 14*4, S22, 0xd6, 0x07, 0x37, 0xc3
;/* 26 */
db    LOW MD5_C, LOW MD5_D, LOW MD5_A, LOW MD5_B,  3*4, S23, 0x87, 0x0d, 0xd5, 0xf4
;/* 27 */
db    LOW MD5_B, LOW MD5_C, LOW MD5_D, LOW MD5_A,  8*4, S24, 0xed, 0x14, 0x5a, 0x45
;/* 28 */
db    LOW MD5_A, LOW MD5_B, LOW MD5_C, LOW MD5_D, 13*4, S21, 0x05, 0xe9, 0xe3, 0xa9
;/* 29 */
db    LOW MD5_D, LOW MD5_A, LOW MD5_B, LOW MD5_C,  2*4, S22, 0xf8, 0xa3, 0xef, 0xfc
;/* 30 */
db    LOW MD5_C, LOW MD5_D, LOW MD5_A, LOW MD5_B,  7*4, S23, 0xd9, 0x02, 0x6f, 0x67
;/* 31 */
db    LOW MD5_B, LOW MD5_C, LOW MD5_D, LOW MD5_A, 12*4, S24, 0x8a, 0x4c, 0x2a, 0x8d
;/* 32 */
```

FIG. 5B

```
.db LOW MD5_A, LOW MD5_B, LOW MD5_C, LOW MD5_D,  5*4, S31, 0x42, 0x39, 0xfa, 0xff
;/* 33 */
.db LOW MD5_D, LOW MD5_A, LOW MD5_B, LOW MD5_C,  8*4, S32, 0x81, 0xf6, 0x71, 0x87
;/* 34 */
.db LOW MD5_C, LOW MD5_D, LOW MD5_A, LOW MD5_B, 11*4, S33, 0x22, 0x61, 0x9d, 0x6d
;/* 35 */
.db LOW MD5_B, LOW MD5_C, LOW MD5_D, LOW MD5_A, 14*4, S34, 0x0c, 0x38, 0xe5, 0xfd
;/* 36 */
.db LOW MD5_A, LOW MD5_B, LOW MD5_C, LOW MD5_D,  1*4, S31, 0x44, 0xea, 0xbe, 0xa4
;/* 37 */
.db LOW MD5_D, LOW MD5_A, LOW MD5_B, LOW MD5_C,  4*4, S32, 0xa9, 0xcf, 0xde, 0x4b
;/* 38 */
.db LOW MD5_C, LOW MD5_D, LOW MD5_A, LOW MD5_B,  7*4, S33, 0x60, 0x4b, 0xbb, 0xf6
;/* 39 */
.db LOW MD5_B, LOW MD5_C, LOW MD5_D, LOW MD5_A, 10*4, S34, 0x70, 0xbc, 0xbf, 0xbe
;/* 40 */
.db LOW MD5_A, LOW MD5_B, LOW MD5_C, LOW MD5_D, 13*4, S31, 0xc6, 0x7e, 0x9b, 0x28
;/* 41 */
.db LOW MD5_D, LOW MD5_A, LOW MD5_B, LOW MD5_C,  0*4, S32, 0xfa, 0x27, 0xa1, 0xea
;/* 42 */
.db LOW MD5_C, LOW MD5_D, LOW MD5_A, LOW MD5_B,  3*4, S33, 0x85, 0x30, 0xef, 0xd4
;/* 43 */
.db LOW MD5_B, LOW MD5_C, LOW MD5_D, LOW MD5_A,  6*4, S34, 0x05, 0x1d, 0x88, 0x04
;/* 44 */
.db LOW MD5_A, LOW MD5_B, LOW MD5_C, LOW MD5_D,  9*4, S31, 0x39, 0xd0, 0xd4, 0xd9
;/* 45 */
.db LOW MD5_D, LOW MD5_A, LOW MD5_B, LOW MD5_C, 12*4, S32, 0xe5, 0x99, 0xdb, 0xe6
;/* 46 */
.db LOW MD5_C, LOW MD5_D, LOW MD5_A, LOW MD5_B, 15*4, S33, 0xf8, 0x7c, 0xa2, 0x1f
;/* 47 */
.db LOW MD5_B, LOW MD5_C, LOW MD5_D, LOW MD5_A,  2*4, S34, 0x65, 0x56, 0xac, 0xc4
;/* 48 */
```

```
;/* 49 */    .db LOW MD5_D, LOW MD5_A, LOW MD5_B, LOW MD5_C,  7*4, S42, 0x97, 0xff,  0x2a, 0x43
;/* 50 */    .db LOW MD5_C, LOW MD5_D, LOW MD5_A, LOW MD5_B, 14*4, S43, 0xa7, 0x23,  0x94, 0xab
;/* 51 */    .db LOW MD5_B, LOW MD5_C, LOW MD5_D, LOW MD5_A,  5*4, S44, 0x39, 0xa0,  0x93, 0xfc
;/* 52 */    .db LOW MD5_A, LOW MD5_B, LOW MD5_C, LOW MD5_D, 12*4, S41, 0xc3, 0x59,  0x5b, 0x65
;/* 53 */    .db LOW MD5_D, LOW MD5_A, LOW MD5_B, LOW MD5_C,  3*4, S42, 0x92, 0xcc,  0x0c, 0x8f
;/* 54 */    .db LOW MD5_C, LOW MD5_D, LOW MD5_A, LOW MD5_B, 10*4, S43, 0x7d, 0xf4,  0xef, 0xff
;/* 55 */    .db LOW MD5_B, LOW MD5_C, LOW MD5_D, LOW MD5_A,  1*4, S44, 0xd1, 0x5d,  0x84, 0x85
;/* 56 */    .db LOW MD5_A, LOW MD5_B, LOW MD5_C, LOW MD5_D,  8*4, S41, 0x4f, 0x7e,  0xa8, 0x6f
;/* 57 */    .db LOW MD5_D, LOW MD5_A, LOW MD5_B, LOW MD5_C, 15*4, S42, 0xe0, 0xe6,  0x2c, 0xfe
;/* 58 */    .db LOW MD5_C, LOW MD5_D, LOW MD5_A, LOW MD5_B,  6*4, S43, 0x14, 0x43,  0x01, 0xa3
;/* 59 */    .db LOW MD5_B, LOW MD5_C, LOW MD5_D, LOW MD5_A, 13*4, S44, 0xa1, 0x11,  0x08, 0x4e
;/* 60 */    .db LOW MD5_A, LOW MD5_B, LOW MD5_C, LOW MD5_D,  4*4, S41, 0x82, 0x7e,  0x53, 0x7
;/* 61 */    .db LOW MD5_D, LOW MD5_A, LOW MD5_B, LOW MD5_C, 11*4, S42, 0x35, 0xf2,  0x3a, 0xbd
;/* 62 */    .db LOW MD5_C, LOW MD5_D, LOW MD5_A, LOW MD5_B,  2*4, S43, 0xbb, 0xd2,  0xd7, 0x2a
;/* 63 */    .db LOW MD5_B, LOW MD5_C, LOW MD5_D, LOW MD5_A,  9*4, S44, 0x91, 0xd3,  0x86, 0xeb
;/* 64 */
```

EFFICIENT IMPLEMENTATION OF MD5 MESSAGE-DIGEST ALGORITHM (RFC1321) ON AN 8 BIT MICRO-CONTROLLER

This application claims priority under 35 U.S.C. § 119(e) to U.S. Provisional Patent Application No. 60/385,476 filed on Jun. 3, 2002.

FIELD AND BACKGROUND OF THE INVENTION

The present invention relates to implementation of the MD5 Message Digest ("MD5") algorithm.

The MD5 algorithm is intended for digital signature applications, where a data message must be signed in a secure manner before being sent. The algorithm takes as input a message of arbitrary length and produces as output a 128-bit "fingerprint" or "message digest" of the input. It is assumed that it is computationally infeasible to produce two messages having the same message digest, or to produce any two messages having a given pre-specified target message digest.

The MD5 algorithm is optimized for 32-bit processors. In addition, the MD5 algorithm does not require any large substitution tables; the algorithm can be coded quite compactly.

Figure 1:
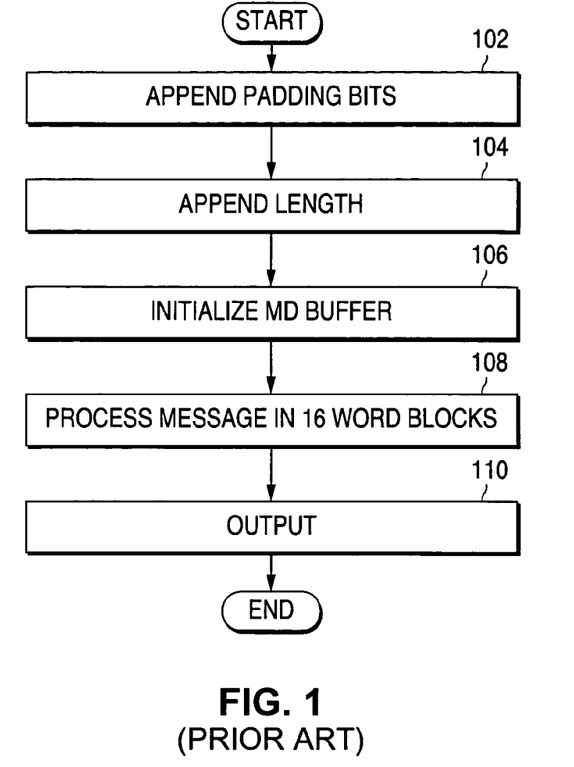
FIG. 1 is a flowchart of the MD5 algorithm.

Refer to FIG. 1 which illustrates a flowchart of the algorithm. It is assumed that the input is a b-bit message and the objective is to obtain the message digest of the input. Here, b is an arbitrary non-negative integer. It is also possible that b may be zero. The bits of the message are as follows:

$m_0, m_1 \ldots m_{(b-1)}$

In the first step 102, the message is padded (i.e. extended) so that the length in bits is congruent to 448, modulo 512. In other words, the message is extended so that the message is just 64 bits shy of being a multiple of 512 bits long. Typically padding is performed even if the length of the message is already congruent to 448 modulo 512. Padding is performed as follows: a single "1" bit is appended to the message, and then "0" bits are appended so that the length in bits of the padded message becomes congruent to 448, modulo 512. In all, at least one bit and at most 512 bits are appended.

In the second step 104, a 64 bit representation of b (the length of the message before the padding bits were added) is appended to the result of the previous step. In the unlikely even that b is greater than $2^{64}$, then only the low-order 64 bits of b are used. (These bits are appended as two 32 bit words and appended low-order word first in accordance with previous conventions). At this point the resulting message (after padding with bits and with b) has a length that is the exact multiple of 512 bits. Equivalently, this message has a length that is an exact multiple of 16 (32-bit) words. Let M[0 . . . N−1] denote the words of the resulting message, where N is a multiple of 16.

A four word buffer [A, B, C, D] is used to compute the message digest. Here each of A, B, C, D is a 32 bit register. In step 106 these registers are initialized to the following values in hexadecimal, low order bytes first:

word A: 01 23 45 67
word B: 89 ab cd ef
word C: fe dc ba 98
word D: 76 54 32 10

In step 108, the message is processed in 16-word blocks. Note the following definitions: Let "+" denote addition of words (i.e. modulo-$2^{32}$ addition). Let X<<<s denote the 32 bit value obtained by circularly shifting (rotating) X left by s bit positions. Let not(X) denote the bit-wise complement of X and let X v Y denote the bit-wise OR of X and Y. Let X xor Y denote the bit-wise XOR of X and Y and let XY denote the bit-wise AND of X and Y.

Four auxiliary functions are defined, each of which takes as input three 32-bit words and produces as output one 32-bit word:

F(X,Y,Z) XY v not(X) Z
G(X,Y,Z)=XZ v Y not(Z)
H(X,Y,Z)=X xor Y xor Z
I(X,Y,Z)=Y xor (X v not(Z)).

In each bit position F acts as a conditional: i.e. if X then Y else Z. The function F could have been defined using +instead of v since XY and not(X) Z will never have 1's in the same bit position. If the bits of X, Y, and Z are independent and unbiased, then each bit of F(X,Y, Z) will be independent and unbiased.

The functions G, H and I are similar to the function F in that these functions act in "bitwise parallel" to produce the output from the bits of X, Y and Z in such a manner that if the corresponding bits of X,Y and Z are independent and unbiased, then each bit of G(X,Y, Z), H(X,Y, Z) and I(X,Y,Z) will be independent and unbiased. Note that the function H is the bit-wise "xor" or "parity" of its inputs.

Step 108 uses a 64 element table T[1 . . . 64] constructed from the sine function. Let T[i] denote the i-th element of the table, which is equal to the integer part of 4294967296 times abs (sin (i)), where i is in radians. Pseudo code for step 108 is presented here:

```
/*Process each 16-word block*/
For i=0 to N/16-1 do
/*copy block i into X. */
For j=0 to 15 do
   Set X[j] to M[i*16+j].
end /*end of loop on j*/
/* Save A as AA, B as BB, C as CC, and D as DD.*/
AA=A
BB=B
CC=C
DD=D
/* Round 1*/
/* let FF[abcd k s i] denote the operation
a=b+((a+F(b,c,d)+X[k]+T[i]<<<s)*/
/* Do the following 16 operations. */
FF[ABCD 0 7 1] FF[DABC 1 12 2] FF[CDAB 2 17 3]
   FF[BCDA 3 22 4]
FF[ABCD 4 7 5] FF[DABC 5 12 6] FF[CDAB 6 17 7]
   FF[BCDA 7 22 8]
FF[ABCD 8 7 9] FF[DABC 9 12 10] FF[CDAB 10 17 11]
FF[BCDA 11 22 12]
FF[ABCD 12 7 13] FF[DABC 13 12 14] FF[CDAB 14 17
   15]
FF[BCDA 15 22 16]
/*Round 2*/
/* let GG[abcd k s i] denote the operation
a=b+((a+G(b,c,d)+X[k]+T[i]<<<s)*/
/* Do the following 16 operations. */
GG[ABCD 1 5 17] GG[DABC 6 9 18] GG[CDAB 11 14
   19]
GG[BCDA 0 20 20]
GG[ABCD 5 5 21] GG[DABC 10 9 22] GG [CDAB 15
   14
23] GG[BCDA 4 20 24]
GG[ABCD 9 5 25] GG [DABC 14 9 26] GG[CDAB 3 14
   27]
GG[BCDA 8 20 28]
```

GG[ABCD 13 5 29] GG[DABC 2 9 30] GG[CDAB 7 14 31]
GG[BCDA 12 20 32]
/*Round 3*/
/* let HH[abcd k s i] denote the operation
a=b+((a+H(b,c,d)+X[k]+T[i]<<<s)*/
/* Do the following 16 operations. */
HH[ABCD 5 4 33] HH[DABC 8 11 34] HH[CDAB 11 16 35]
HH[BCDA 14 23 36]
HH[ABCD 1 4 37] HH[DABC 4 11 38] HH[CDAB 7 16 39]
HH[BCDA 10 23 40]
HH[ABCD 13 4 41] HH[DABC 0 11 42] HH[CDAB 3 16 43]
HH[BCDA 6 23 44]
HH[ABCD 9 4 45] HH[DABC 12 11 46] HH[CDAB 15 16 47]
HH[BCDA 2 23 48]
/*Round 4*/
/* let II[abcd k s i] denote the operation
a=b+((a+I(b,c,d)+X[k]+T[i]<<<s)*/
/* Do the following 16 operations. */
II[ABCD 0 6 49] II[DABC 7 10 50] II[CDAB 14 15 51]
II[BCDA 5 21 52]
II[ABCD 12 6 53] II[DABC 3 10 54] II [CDAB 10 15 55]
II[BCDA 1 21 56]
II[ABCD 8 6 57] II [DABC 15 10 58] II[CDAB 6 15 59]
II[BCDA 13 21 60]
II[ABCD 4 6 61] II[DABC 11 10 62] II[CDAB 2 15 63]
II[BCDA 9 21 64]
/* Then perform the following addition. (That is increment each of the four registers by the value the register had before the block was started.)*/
A=A+AA
B=B+BB
C=C+CC
D=D+DD
end /*end of loop on i */

To understand better the scope of each operation, analyzed below is the first operation of round 1: FF[ABCD 0 7 1].

The call procedure for the operation involves copying the seven elements from read only memory ROM and/or random access memory RAM to a RAM stack and/or register and calling the operation. An example of pseudo code including pushing the elements to a RAM stack is listed below:

push A
push B
push C
push D
push X[0]
push 7
push T[1]
call operation FF
pop all Pushing an element involves copying the element from ROM or RAM to a RAM stack. (The term "loading" is generally used to denote copying the element from ROM or RAM to a register). Each variable A, B, C, D, and X includes four bytes. The constant '7' includes one byte and the constant T[1] includes four bytes. Therefore in total 25 bytes are copied to the RAM stack or registers for each operation (recall that the four rounds include a total of 64 operations).

In step 110 the message digest produced as output is A, B, C, D. That is, the digest begins with the low-order byte of A and ends with the high order byte of D.

What is needed in the art is a system and method to efficiently implement the MD5 algorithm using an 8 bit micro-controller.

SUMMARY OF THE INVENTION

According to the present invention there is provided a system for implementing an MD5 algorithm on an 8 bit micro-controller, including: at least one table stored in read only memory ROM including at least one table entry, each at least one table entry corresponding to an operation in the MD5 algorithm and including at least one pointer to at least one variable required for the operation, wherein the at least one variable includes four bytes and the at least one pointer includes less than four bytes; a memory with write ability configured to store a pointer to a current table entry corresponding to a current operation in the MD5 algorithm; and a processor configured to pass to the memory the pointer to the current table entry and configured to retrieve from the current entry at least one of the pointers to the at least one variable required for the current corresponding operation, and configured to execute the current corresponding operation.

According to the present invention there is also provided, a method for implementing an MD5 algorithm on an 8 bit micro-controller, including: providing a pointer to an entry in a table stored in ROM, the entry corresponding to an operation in the MD5 algorithm; retrieving from the entry at least one pointer to at least one variable required for the operation; and performing the operation.

According to the present invention there is further provided, a program storage device readable by machine, tangibly embodying a program of instructions executable by the machine to perform method steps for implementing a MD5 algorithm on an 8 bit micro-controller, including: providing a pointer to an entry in a table stored in ROM, the entry corresponding to an operation in the MD5 algorithm; retrieving from the entry at least one pointer to at least one variable required for said operation; and performing the operation.

According to the present invention there is still further provided, a computer program product comprising a computer useable medium having computer readable program code embodied therein for implementing an MD5 algorithm on an 8 bit micro-controller, the computer program product including: computer readable program code for causing the computer to provide a pointer to an entry in a table stored in ROM, the entry corresponding to an operation in the MD5 algorithm; computer readable program code for causing the computer to retrieve from the entry at least one pointer to at least one variable required for the operation; and computer readable program code for causing the computer to perform the operation.

BRIEF DESCRIPTION OF THE DRAWINGS

The invention is herein described, by way of example only, with reference to the accompanying drawings, wherein.

DESCRIPTION OF THE PREFERRED EMBODIMENTS

A preferred embodiment of the present invention is of an efficient implementation of the MD5 algorithm using an 8 bit micro-controller.

As was mentioned above, the MD5 algorithm was developed for a 32 bit processor. However, due to the advantages of the MD5 algorithm, for example for a digital signature, it is desirable to also be able to implement the algorithm on an 8 bit micro-controller. For a particular system, an 8 bit micro-controller may be preferred over a 32 bit machine, for example because of the lower cost and/or smaller size requirements. As it is well known in the art, 32 bit operations can be emulated on an 8 bit micro-controller, however the emulation is extremely inefficient.

The implementation described below is particularly advantageous for systems with limited memory (ROM and/or RAM).

The principles and operation of an efficient implementation of the MD5 algorithm on an 8 bit micro- controller according to the present invention may be better understood with reference to the drawings and the accompanying description. All examples presented are non-limiting illustrations of the invention described herein. Each feature of the invention on its own or in conjunction with one or more other features of the invention constitutes a separate preferred embodiment.

Refer back to step 108 "processing message" in FIG. 1. Note that the same variables A, B, C, D and X in different permutations are used in each function. Therefore one feature of the present invention is to define these variables globally, thereby providing a defined memory location for each variable in RAM. In accordance with the MD5 algorithm, each variable is defined for 4 bytes. Pseudo code is presented below:

A: .dsb 4
B: .dsb 4
C: .dsb 4
D: .dsb 4
X: .dsb 4

Another feature of the invention is to pass whenever possible pointers to variables rather than the variables themselves. As is well known in the art, pointers point to memory locations. Therefore a pointer to a variable, points to the memory location of the variable. The pointers can include as many bits as allowed by the processor rather than the 32 bits of the variables. For example an 8 bit micro-controller typically uses between 8-bit and 16-bit pointers. To elaborate on the example, assume that 16-bit pointers are used. In this example, the micro-controller can work with only the less significant byte as long as the micro-controller is working on the same page of memory. Only when a change in page is required does the more significant byte need to be changed.

Another feature of the invention is to store the constants and pointers to the variables in a ROM table. Preferably the constants and the pointers to the variables are stored in the order in which the constants and the pointers are used, thereby allowing simplified iterative code for accessing the constants and the pointers when needed. It should be noted that because the variables were globally defined, the memory location of each variable is known and the pointers to the variables can therefore be stored in ROM.

Figure 2:
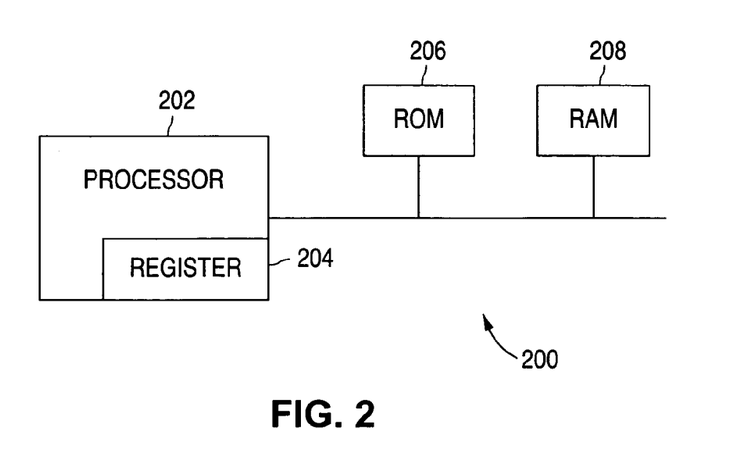
FIG. 2 is a system for executing the MD5 algorithm, according to a preferred embodiment of the present invention.

Referring now to the drawings, FIG. 2 illustrates a system 200 of the invention, in accordance with a preferred embodiment. An 8 bit processor 202 includes one or more registers 204. Types of registers 204 include index registers for storing addresses of memory locations (or pointers to memory locations) and data registers for storing contents of memory locations. Processor 202 can access a memory location in ROM 206 for tables including constants and pointers to variables, or a memory location in RAM 208 for variables, by providing either an absolute (direct) address or an indirect address (or pointer). When performing an operation, typically at least one operand is loaded into register 204 and the result is placed in register 204 or RAM 208.

Figure 3:
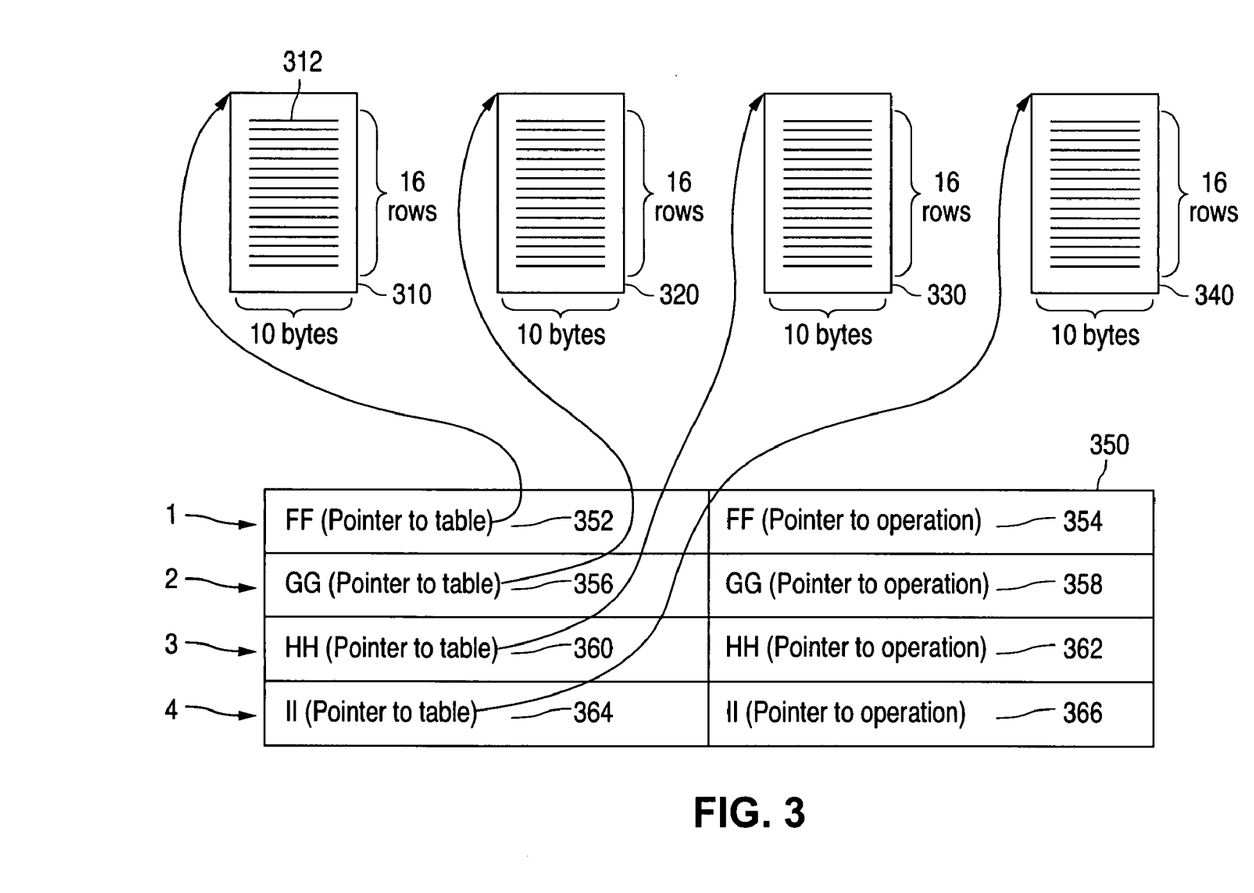
FIG. 3 illustrates the round tables and the look-up table stored in ROM, according to a preferred embodiment of the present invention.

Refer to FIG. 3 which in accordance with a preferred embodiment of the present invention, illustrates four tables 310, 320, 330 and 340 stored in ROM 206, one for each round of step 108. There are 16 rows in each table, corresponding to the 16 operations of the corresponding round.

Figure 4:
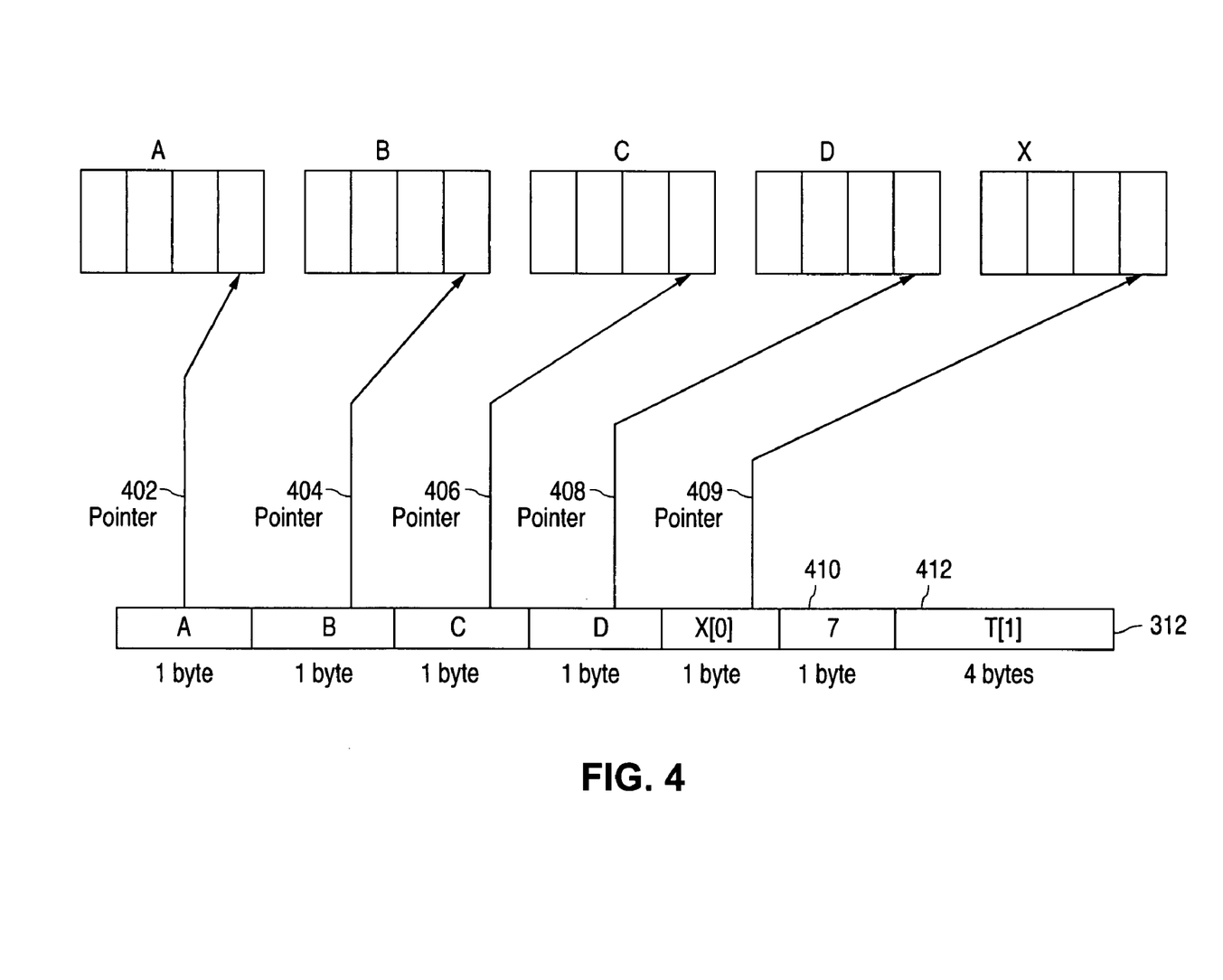
FIG. 4 illustrates the first entry in the first round table, according to a preferred embodiment of the present invention
Figure 5A:
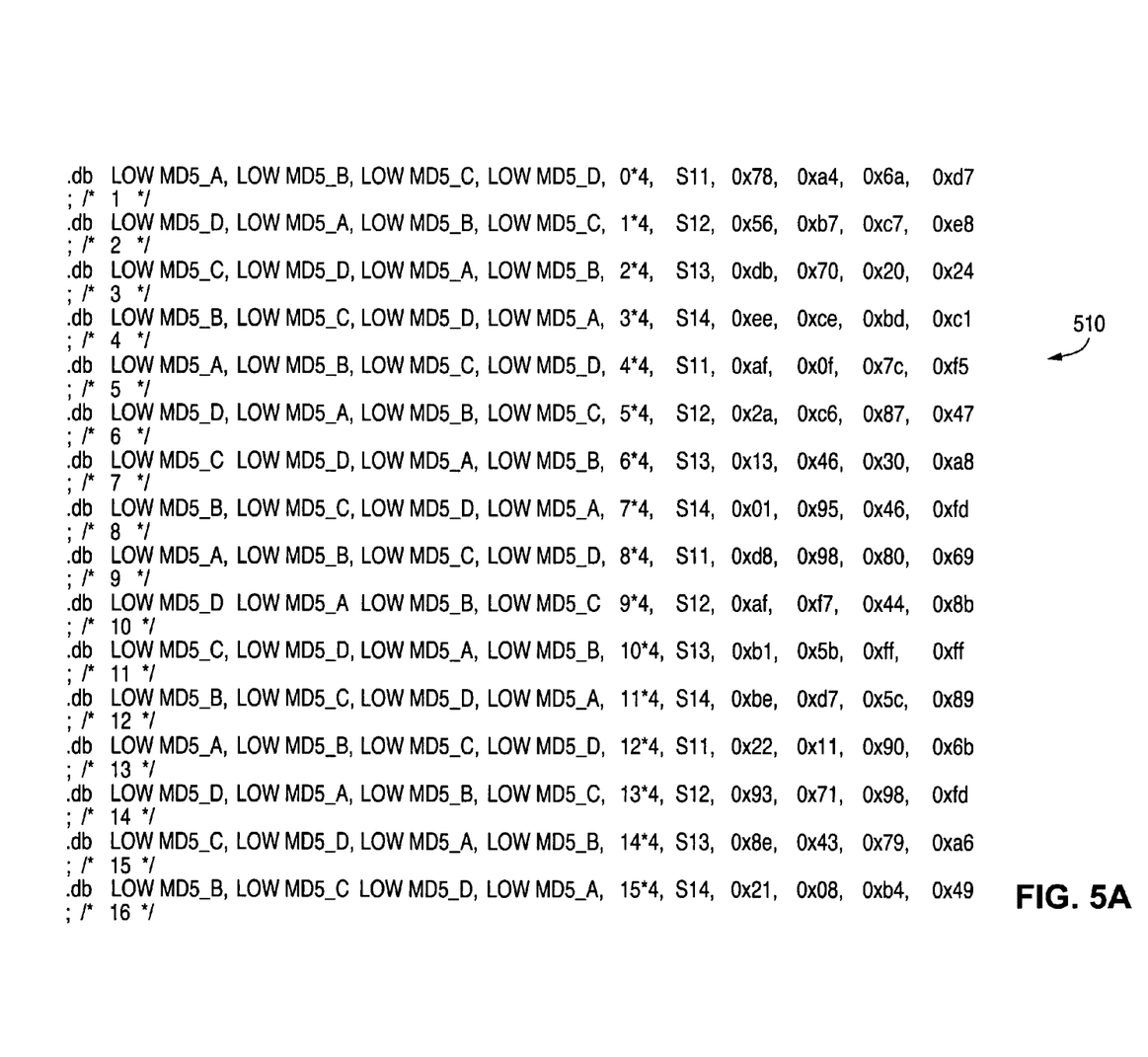
FIGS. 5A-5D are a print-out of an example of code for the round tables stored in ROM, according to a preferred embodiment of the present invention.
Figure 5B:
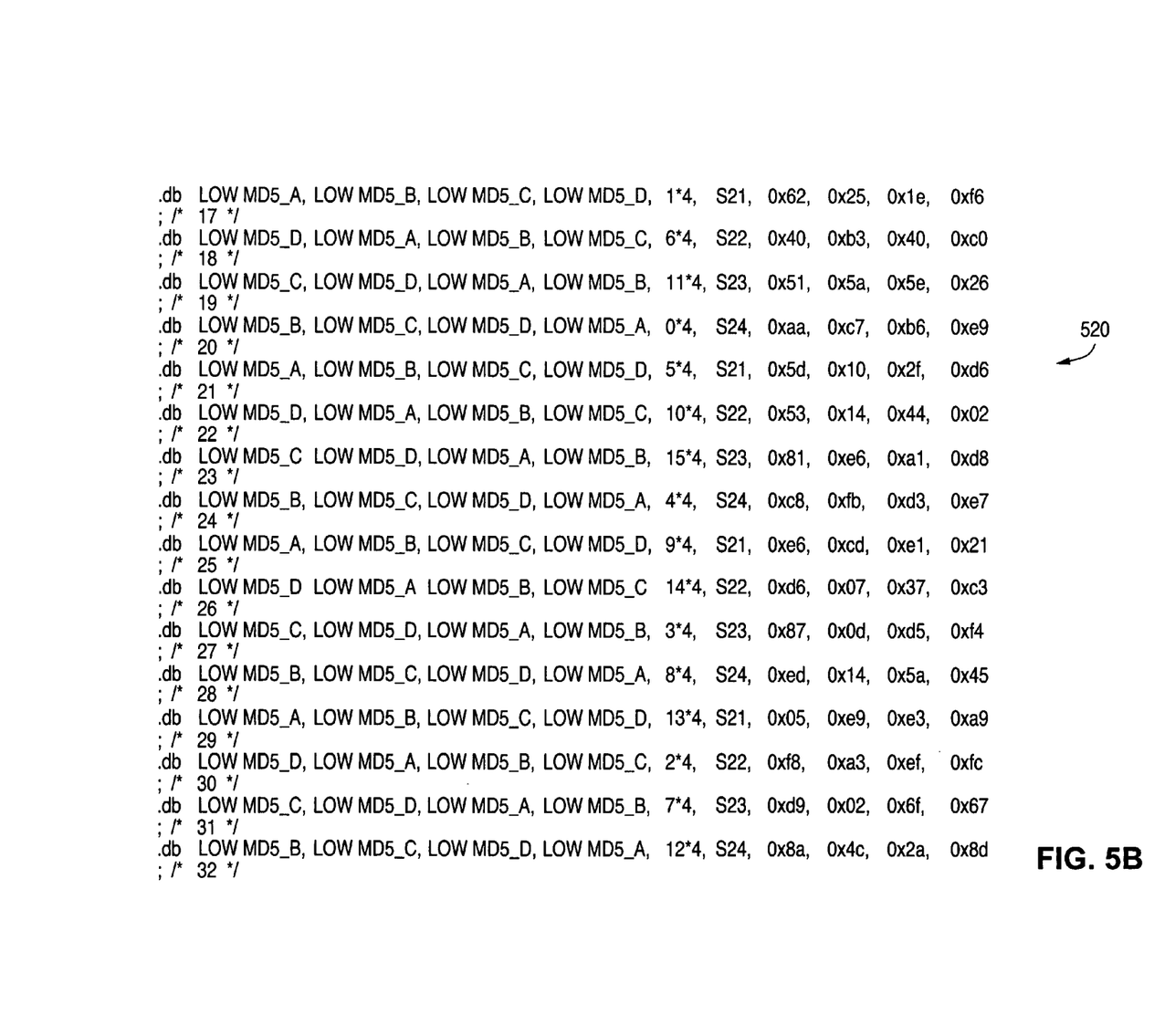
Figure 5C:
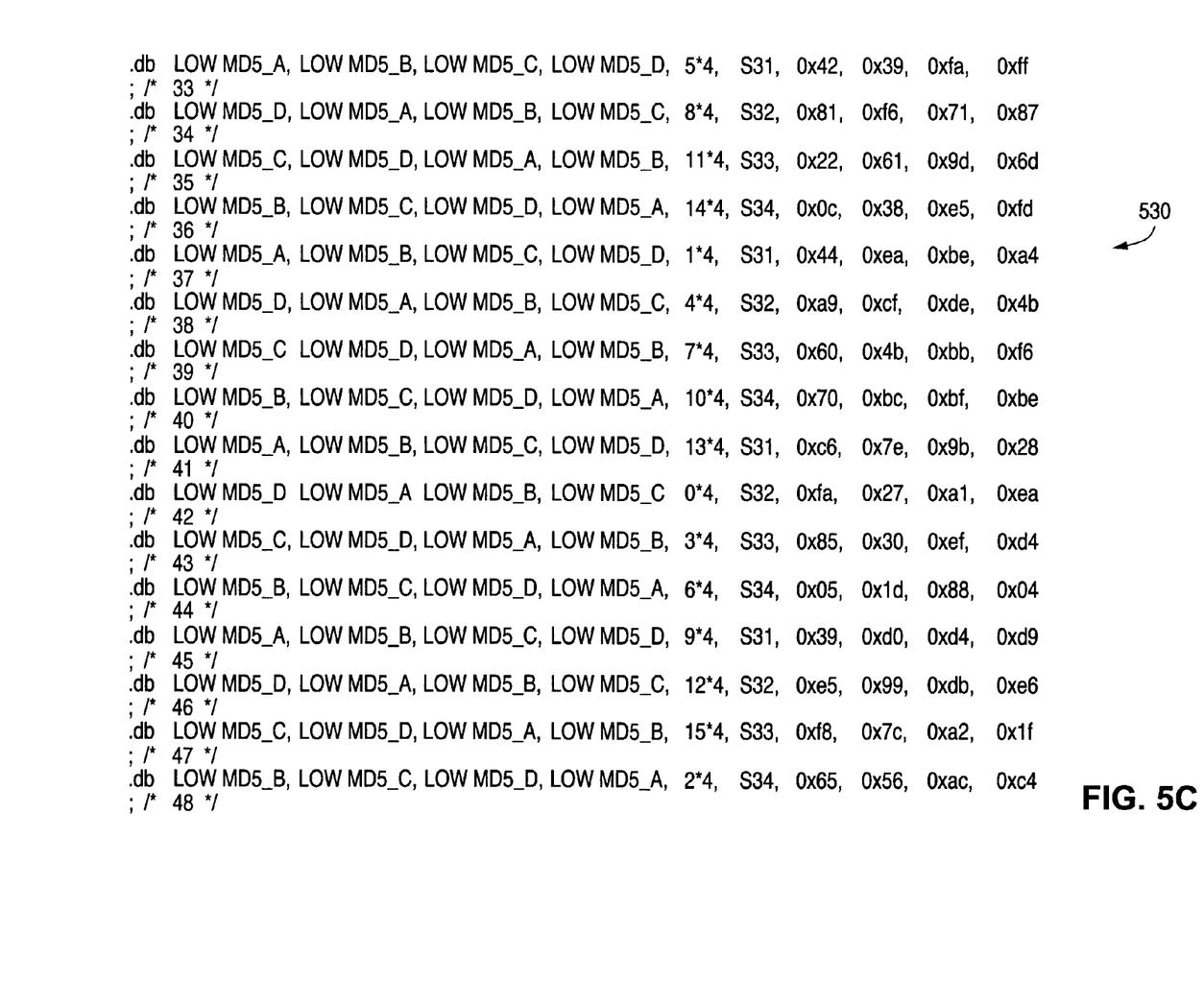
Figure 5D:
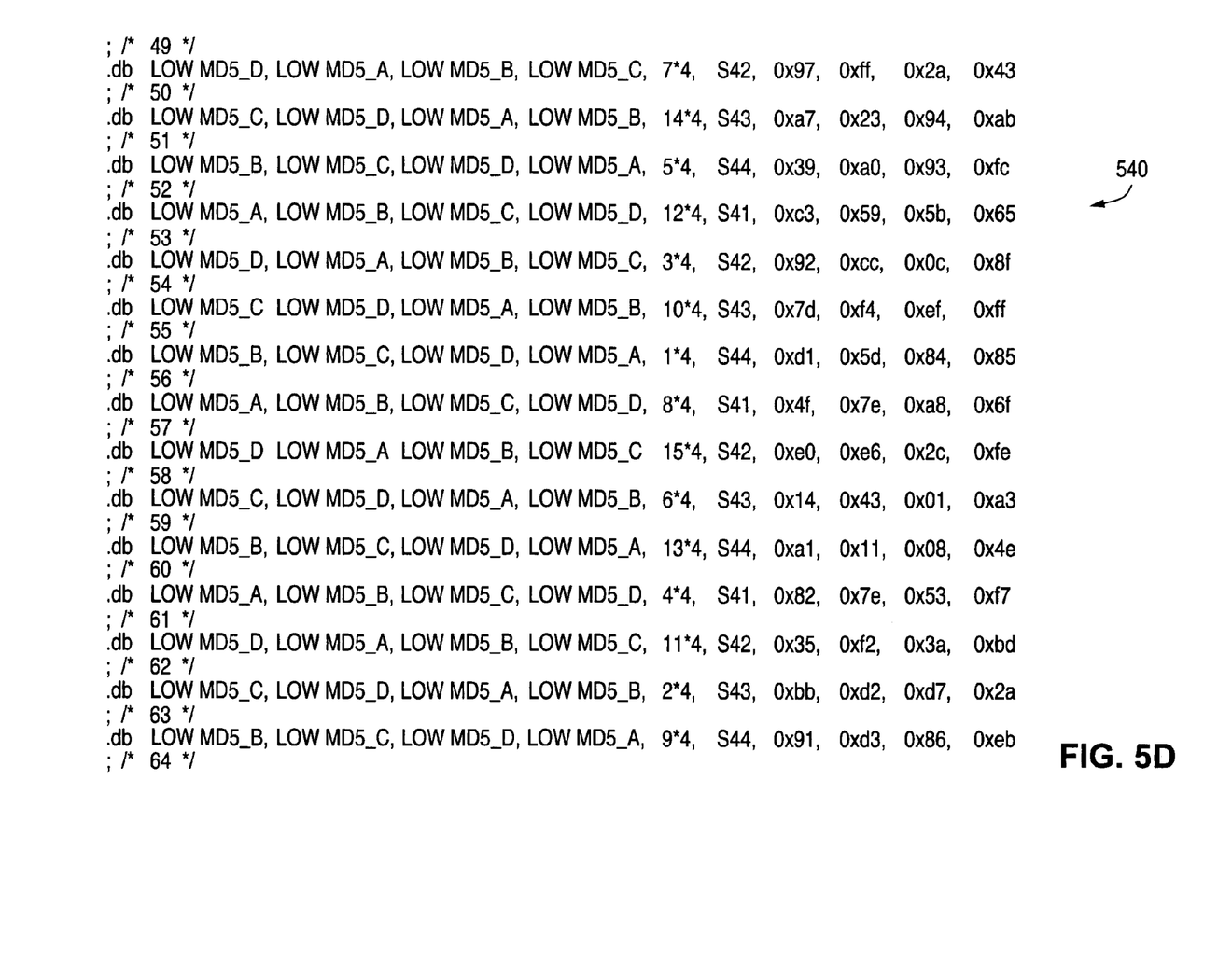

Refer to FIG. 4 which shows the first row 312 of table 310, in accordance with a preferred embodiment of the present invention. In this embodiment, each row includes ten bytes. Recall that the first operation of the first round is FF[ABCD X[0] 7 T[1]]. Therefore the first byte includes a pointer 402 to variable A, the second byte includes a pointer 404 to variable B, the third byte includes a pointer 406 to variable C, the fourth byte includes a pointer 408 to variable D, and the fifth byte includes a pointer 409 to variable X. For example each pointer can point to the least significant byte (out of the four bytes) of the variable. The last 5 bytes of the row (shown as 410 and 412) are constants (for this row, 7 and T[1], where T[1] includes 4 bytes and 7 includes one byte).

Optionally and preferably, a look up table 350 (FIG. 3) is also stored in ROM. Each row of look up table 350 includes a pointer 352 356, 360, or 364 to a different one of tables 310, 320, 330 and 340, for example to the beginning of the table. Each row also includes a pointer 354, 358, 362 or 366 to the operation to be applied for that table, where FF is the operation corresponding to the first round, GG the operation corresponding to the second round, HH the operation corresponding to the third round and II the operation corresponding to the fourth round.

FIGS. 5A-5D show an example of code for the tables 310, 320, 330 and 340 according to a preferred embodiment of the present invention, where the exemplary tables are numbered 510, 520, 530 and 540 respectively.

Figure 6:
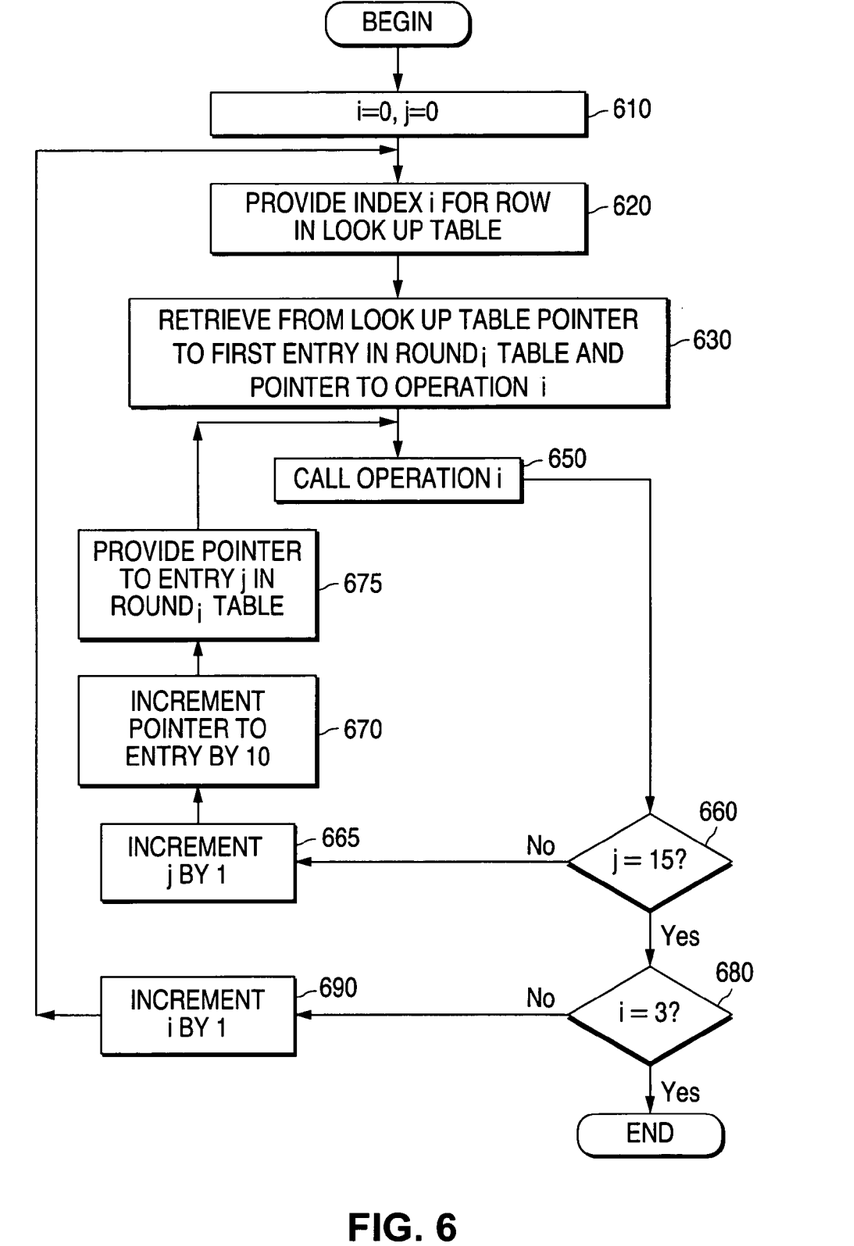
FIG. 6 is a flowchart illustrating the procedure for calling the operations for the rounds according to a preferred embodiment of the present invention.

Refer now to FIG. 6 which shows a flowchart of the procedure for calling operations using tables 310, 320, 330, 340 and 350 stored in ROM 206, in accordance with a preferred embodiment of the present invention.

In step 610, processor 202 initializes values for variables i and j. In step 620, processor 202 provides the index to the row in look up table 350 corresponding to the first round, for example the index 1 if the rounds are listed in order. The index, for example is loaded into one of index registers 204 or pushed onto RAM stack 208.

In step 630, processor 202 retrieves from look up table 350 the pointer 352 pointing to round table 310 and the pointer 354 pointing to operation FF, i.e. the operation corresponding to table 310. Pointer 352 points to first row 312 of table 310, preferably to the beginning (first byte) of first row 312. Pointer 352 for example is loaded into one of index registers 204 or pushed onto RAM stack 208. In step 650, pointer 354 is used to call operation FF. For each subsequent operation in the same round, pointer 352 is incremented in step 670 by 10 (number of bytes in one entry) so as to point to the first byte in the next entry and the incremented pointer is for example loaded into one of index registers 204 or pushed onto RAM stack 208 (step 675) prior to calling operation FF (step 650). Once the FF round is complete, the procedure is repeated for the other rounds corresponding to operations GG, HH and II.

Note that in the call procedure according to the preferred embodiment described above only three bytes are pushed onto RAM stack 208 (or loaded into registers 204) for each operation: one byte for pointer 352, 356, 360 or 364 to the current entry in table 310, 320, 330 or 340 and two bytes of return point from the current operation. There is therefore a conservation of RAM memory 208 (or register memory 204) compared to the prior art where 25 bytes were pushed onto a RAM stack (or loaded into registers) for each operation.

Figure 7:
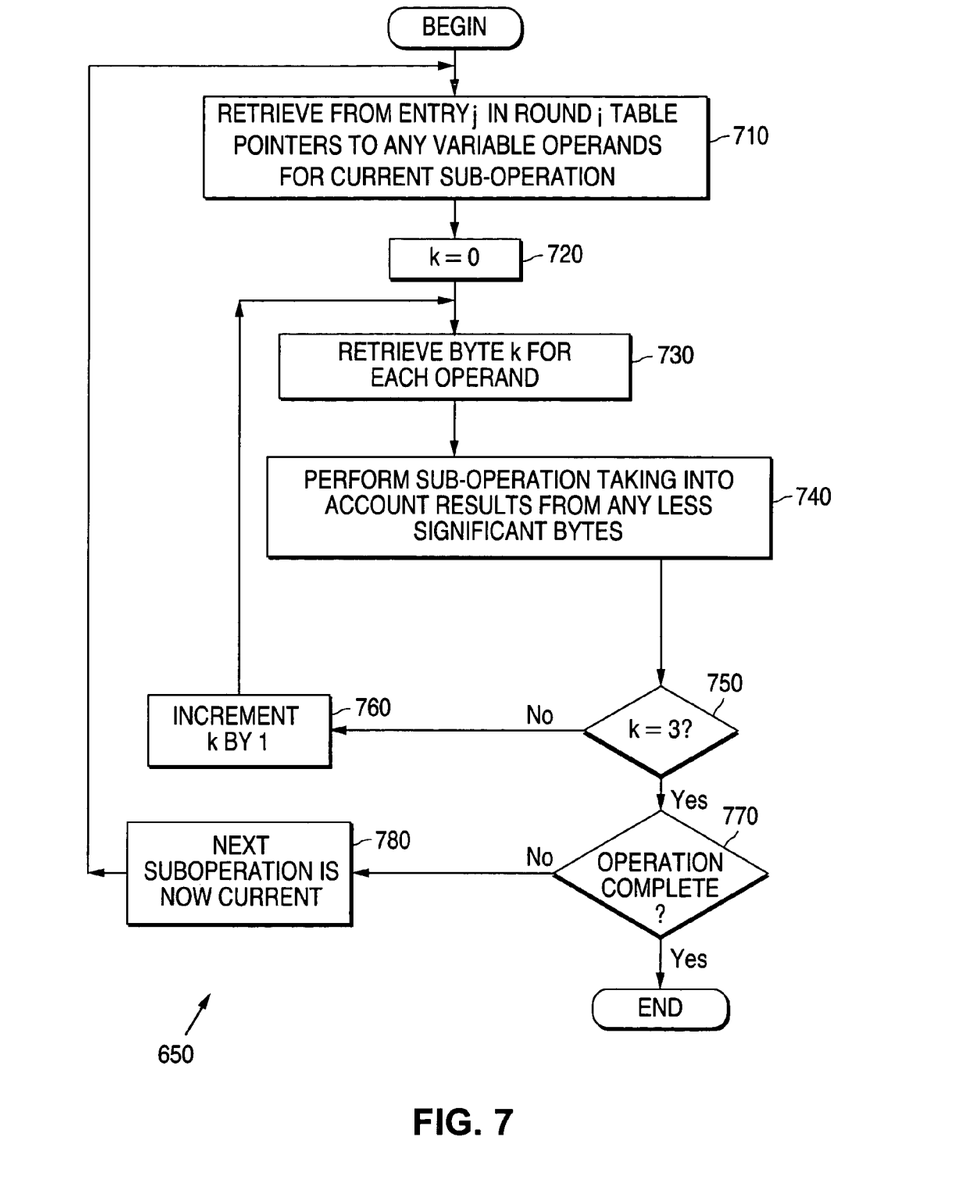
FIG. 7 is a flowchart illustrating the execution of the operations for the rounds, according to a preferred embodiment of the present invention.

Refer to FIG. 7 which shows step 650 for calling the operation in more detail, in accordance with a preferred embodiment of the present invention. Described is step 650 for the first operation in round 1. Assume again that pointer 352 points to the first byte of entry 312 (FIG. 4) corresponding to the first operation. Recall from FIG. 4 that each entry includes ten bytes. Recall also that each operation involves operands listed in a set order. For example, the operation A=B+((A+F (B,C,D)+X[0]+T[1]<<<7) is indicated in entry 312 as [A, B, C, D, X[0], 7, T[1]]. Therefore, by providing an offset to pointer 352, other bytes in the entry can be indicated. For example in the case of the first entry, the byte containing a pointer to A can be indicated by providing an offset of 0 to pointer 352. As another example, the byte containing the constant 7 can be indicated by providing an offset of 5.

Each operation typically includes sub-operations involving one or more operands. In step 710, processor 202 retrieves from table 310 (row 312), pointers to any variable operands required for the current sub-operation. For example assuming B and C are needed, pointers 404 and 406 contained in the second and third byte respectively of first entry 312 are retrieved. The pointers to the operands are loaded into index registers 204 (or onto the RAM stack). For example pseudo code to load pointer 404 to operand B into an index register 204 can be:

load index_register, entry[index+1]

where entry[index] is pointer 352 pointing to the first byte in the entry and 1 is the offset from the first byte in the entry to the byte containing the pointer 404. Similarly pseudo code to load pointer 406 to operand C into an index register 204 can be:

load index_register, entry[index+2]

because the byte containing pointer 406 is offset by 2 from the first byte.

Recall that each variable operand includes 4 bytes. Also the constant T[i] includes four bytes. Therefore, assuming an 8-bit micro-controller, the sub-operation needs to be conducted four times, once for each byte. (The constant 's' designates the number of bit positions to shift and therefore 's' being one byte does not affect the number of times a sub-operation needs to be performed.)

In step 720, the processor 202 initializes the value for variable k. In step 730, the least significant byte of each operand is retrieved. For variable operands, the least significant bytes of the variables are loaded into data registers 204 or maintained on RAM stack 208. It is assumed that any pointer to a variable initially points to the last byte of the variable. Continuing with the example for operand B and assuming pointer 404 was loaded into one of index registers 204, the pseudo code for loading the least significant byte of B into one of data registers 204 can be:

load data_register, [index_register]

In other words, the contents of the address contained in the index register 204 corresponding to pointer 404 is loaded into one of data registers 204.

Any constants retrieved from entry 312 required for the current sub-operation may be loaded into data registers 204, pushed onto RAM stack 208 or not copied to another memory location. For example, assuming it is desirable that constant '7' is loaded into data register 204, the pseudo code can be:

load data_register, entry[index+5]

because the constant '7' is offset by 5 from the first byte of entry 312.

In step 740, the current sub-operation is performed. The procedure repeats for each of the three more significant bytes. For example to load the second least significant byte of variable B to one of data registers 204, and assuming pointer 404 was loaded into one of index registers 204, the pseudo code can be:

load data_register, [index_register+1]

As is well known in the art, when computing the higher order bytes, the results of the computation for the lower order bytes needs to be taken into account. As a simple example, assume an addition of two elements, each with four bytes, on an 8-bit micro-controller:

load index X
load index Y
clear carry flag
for k=0 to 3
load Accumulator, [Y]
add with carry Accumulator, [X] +Accumulator
store [Y], Accumulator
inc X
inc Y
end for Note that the carry from the previous byte is added to the subsequent byte. In the above example, it is assumed that X is a pointer to a variable or a constant and Y is a pointer to a variable. Also, [X] denotes the variable or constant pointed to by X.

The operation continues for subsequent sub-operations in step 770. Once the operation for current entry 312 is complete, if pointer 352 had been pushed onto RAM stack 208 then the memory location in RAM stack 208 containing pointer 352 to current entry 312 is freed so that incremented pointer 352 to the next entry can subsequently be stored there. Once all operations for current round FF are complete, if the index to round table 310 had been pushed onto RAM stack 208, then the memory location in RAM stack 208 containing the index for the row corresponding to the round is freed so that the index for the next round (GG) can subsequently be stored there.

Attached as an appendix, solely for illustrative purposes, is an example of code for implementing a preferred embodiment of the invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiments, it will be appreciated that many variations, modifications and other applications of the invention may be made.

What is claimed is:

1. A system for implementing an MD5 algorithm on an 8 bit micro-controller, comprising:
   at least one memory configured to store:
      at least one table comprising at least one table entry, each table entry corresponding to an operation in the MD5 algorithm, each table entry comprising one or more pointers to one or more variables required for the corresponding operation; and
      a pointer to a current table entry corresponding to a current operation in the MD5 algorithm; and
   a processor configured to:
      retrieve from the current table entry at least one of the one or more pointers to the one or more variables required for the current operation; and
      execute the current operation.

2. The system of claim 1, wherein the at least one memory comprises:
   a read only memory capable of storing the at least one table; and
   a memory having write ability capable of storing the pointer to the current table entry.

3. The system of claim 1, wherein:
   at least one table entry further comprises one or more constants required for the corresponding operation.

4. The system of claim 1, wherein the at least one memory is further configured to store:
   a lookup table comprising at least one lookup table entry, each lookup table entry comprising a pointer to one of the at least one table and a pointer associated with a round of operations.

5. The system of claim 1, wherein the processor is further configured to:
   execute all of the operations in the MD5 algorithm to generate a message digest for a message.

6. A method for implementing an MD5 algorithm on an 8 bit micro-controller, comprising:
   providing a pointer to an entry in a table, the entry corresponding to an operation in the MD5 algorithm;
   retrieving from the entry at least one pointer to at least one variable required for the operation; and
   performing the operation.

7. The method of claim 6, wherein the at least one variable in the entry is globally defined.

8. The method of claim 6, wherein the entry further comprises one or more constants required for the operation.

9. The method of claim 6, further comprising:
   accessing a lookup table entry in a lookup table, the lookup table entry comprising a pointer to the table.

10. The method of claim 6, further comprising:
   executing all operations in the MD5 algorithm to generate a message digest for a message.

11. A program storage device readable by machine, tangibly embodying a program of instructions executable by the machine to perform method steps for implementing an MD5 algorithm on an 8 bit micro-controller, comprising:
   providing a pointer to an entry in a table, the entry corresponding to an operation in the MD5 algorithm;
   retrieving from the entry at least one pointer to at least one variable required for the operation; and
   performing the operation.

12. The program storage device of claim 11, wherein the at least one variable in the entry is globally defined.

13. The program storage device of claim 11, wherein the entry further comprises one or more constants required for the operation.

14. The program storage device of claim 11, further comprising:
   accessing a lookup table entry in a lookup table, the lookup table entry comprising a pointer to the table.

15. The program storage device of claim 11, further comprising:
   executing all operations in the MD5 algorithm to generate a message digest for a message.

16. A computer program product comprising a computer useable medium having computer readable program code embodied therein for implementing an MD5 algorithm on an 8 bit micro-controller, the computer program product comprising:
   computer readable program code for providing a pointer to an entry in a table, the entry corresponding to an operation in the MD5 algorithm;
   computer readable program code for retrieving from the entry at least one pointer to at least one variable required for the operation; and
   computer readable program code for performing the operation.

17. The computer program product of claim 16, wherein the at least one variable in the entry is globally defined.

18. The computer program product of claim 16, wherein the entry further comprises one or more constants required for the operation.

19. The computer program product of claim 16, further comprising computer readable program code for:
   accessing a lookup table entry in a lookup table, the lookup table entry comprising a pointer to the table.

20. The computer program product of claim 16, further comprising computer readable program code for:
   executing all operations in the MD5 algorithm to generate a message digest for a message.

* * * * *